United States Patent [19]

Gorodetsky et al.

[11] Patent Number: 4,490,922
[45] Date of Patent: Jan. 1, 1985

[54] APPARATUS FOR DRYING AND CALCINATING COATED WELDING ELECTRODES WITH THE USE OF INDUCTION HEATING

[76] Inventors: Alexandr A. Gorodetsky, Grazhdansky prospekt, 128, korpus 1, kv. 45; Nikolai N. Gromov, ulitsa Esenina, 36, korpus 1, kv. 180, both of Leningrad; Vladimir L. Kulzhinsky, ulitsa Zavodskaya, 20, kv. 9, Leningrad, Pargolovo; Rudolf A. Marus, ulitsa Chernyakhovskogo, 11, kv. 57, Leningrad; Solomon E. Ryskin, ulitsa B. Pushkarskaya, 3, kv. 12, Leningrad; Pavel B. Samoilov, prospekt Engelsa, 36, kv. 33, Leningrad; Alexandr N. Shamov, prospekt Engelsa, 36, kv. 42, Leningrad; Nikolai V. Sharygin, ulitsa Esenina, 36, korpus 1, kv. 181, Leningrad; Ivan N. Kireev, ulitsa Belinskogo, 45, kv. 6, Vologodskaya oblast, Cherepovets, all of U.S.S.R.

[21] Appl. No.: 427,982

[22] Filed: Sep. 28, 1982

[51] Int. Cl.³ .................................................. F26B 3/34
[52] U.S. Cl. .......................................... 34/1; 34/107; 118/642; 198/477; 198/679; 219/10.57; 219/10.71; 219/10.79
[58] Field of Search ...................... 34/107, 1; 118/642, 118/641, 643; 198/477, 679; 219/10.57, 10.61 R, 10.71, 10.79

[56] References Cited

U.S. PATENT DOCUMENTS 2,742,017  4/1956  Kennedy .......................... 198/477

FOREIGN PATENT DOCUMENTS 568878   1/1959  Canada ............................. 198/679
1185537  1/1965  Fed. Rep. of Germany ...... 198/679
1565293  3/1972  Fed. Rep. of Germany .

OTHER PUBLICATIONS

I. I. Garnik, et al., "The Production of Metal Electrodes", Moscow, Metallurgia Publishing House, 1975, pp. 88–89.

*Primary Examiner*—Larry I. Schwartz
*Assistant Examiner*—David W. Westphal
*Attorney, Agent, or Firm*—Steinberg & Raskin

[57] ABSTRACT

Disclosed is an apparatus for drying and calcinating coated welding electrodes with the use of induction heating, which comprises a sectionalized slot induction heater provided with a vertically arranged slot and a plurality of electroconductive bus-bars. Each bus-bar has a different vertical width but is supplied an electric current of the same magnitude. The electrodes are conveyed through the slot induction heater using a chain conveyer carrying magnetic holders for holding magnetically the electrodes. Adjacent to the terminal areas of the chain conveyor are disposed an arrangement for loading the untreated electrodes into the above conveyer and an arrangement for unloading therefrom the thermally treated electrodes. The loading arrangement is provided with a receiving machanism allowing the welding electrodes to be arranged in parallel with a preassigned spacing and the bare terminal end of each of the electrodes to be supplied directly to the above magnetic holders, and provided further with a first orientating transporter adjacent to the outlet area of the receiving mechanism and has its carrying run arranged in a descending helical line for transferring the electrodes to a vertical position. The unloading arrangement is provided with a second orientating transporter adjacent to the outlet area of the chain conveyer and has its carrying run arranged in an ascending helical line for withdrawing the electrodes from a vertical position, and provided further with a mechanism for removing the electrodes from the magnetic holders of the chain conveyer.

20 Claims, 8 Drawing Figures

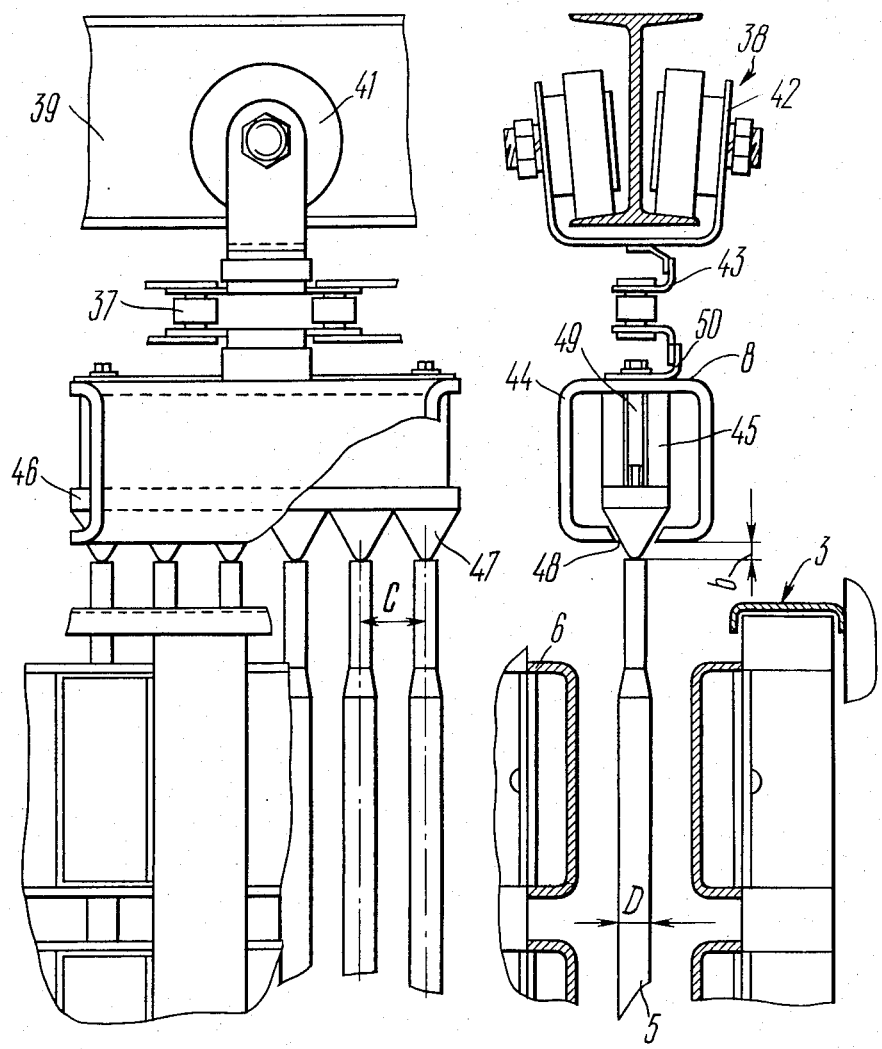

APPARATUS FOR DRYING AND CALCINATING COATED WELDING ELECTRODES WITH THE USE OF INDUCTION HEATING

FIELD OF THE INVENTION

The present invention relates in general to the equipment used in the manufacturing of electrodes for electric arc welding, and more specifically is concerned with apparatus for drying and calcinating coated welding electrodes with the use of induction heating.

In a particular case, the present invention may find application in production lines for manufacturing coated composite electrodes, and, in a general case, in various production lines incorporating sections for high-temperature heating of a number of products, primarily, of elongated shape and capble to be attracted to a magnet.

The present invention can most advantageously be used in high-duty production lines for manufacturing composite welding electrodes with a coating of the basic type.

BACKGROUND OF THE INVENTION

Extensive use has been recently made of apparatus for drying and calcinating coated welding electrodes, which are provided with a means for conveying the electrodes through a heating chamber and in which the thermal treatment of the electrodes may be implemented by a variety of methods, for example, by supplying heated air into the above chamber from air heaters, by using electric heaters arranged above or under the supporting element of the conveying means, by infrared or radiant heating, and so forth. Furthermore, for supplying heat to the welding electrodes being thermally treated, use may be made of different combinations involving the foregoing and other methods.

One of such apparatus available in the prior art (see, for example, I. I. Garnik et al., The Production of Metal Electrodes, Moscow, "Metallurgia" Publishing House, 1975, p. 88-89) comprises a heating chamber having a conveying means arranged thereinside which incorporates horizontal chain conveyers arranged in a number of tiers in height and furnished with side plates secured to their chains, and which is provided with arrangements for loading and unloading the electrodes. The loading arrangement of the apparatus comprises a tray, wherefrom the electrodes to be thermally treated are delivered to a receiving conveyer of the multitier conveying means. The unloading arrangement comprises a plurality of flexible supporting and pulling members. As a heat supplying means, serve tubular electric heating elements mounted inside the heating chamber, disposed in the spaces between the chain conveyers and arranged perpendicularly to the direction of travelling of the runs of the aforesaid conveyers.

In the above-described apparatus the members of each of the chain conveyers, in particular, their bush-roller chains, are located immediately in the zone of the intensive thermal action applied thereto by the electric heating elements. Therefore, as long as the apparatus is operating, the bush-roller chains stay in a heated condition to a temperature which is close to the working temperature of the apparatus. Under these circumstances the bush-roller chains can not function normally for a long time, which results in their quick wearing and subsequent failure.

In the above apparatus, the coated welding electrodes subjected to the thermal treatment may be arranged on the chain conveyer in a few layers in height and while being conveyed they tend to come in contact with one another as well as with the other elements of the conveyer. This may cause the electrodes to stick together and result in the development of embedments in their coating, as well as in the abrasion of and damages to the coating. The coating of the electrodes may be also damaged while they are transferred from the conveyor of one tier of the conveying means to the conveyer of its other tier. However, when the welding electrode has a damaged coating, it is usually discarded.

Furthermore, due to the use of the convection technique of heat supply, which is characterized mainly by the external heating of the coating of the welding electrodes being thermally treated, it is difficult to ensure simultaneously both a high quality of the coating of the finished welding electrodes and a high output of the apparatus. This is explained by the fact that the coating of the welding electrode heated externally is warmed irregularly in its layer thickness, insofar as the most humid portion of this layer, which is adjacent directly to the metal rod of the electrode, is heated in the last place. Therefore, in order to provide the proper conditions for heating of the coating of the welding electrode there is required a comparatively extended period of time. If, however, the process of heating is accelerated by this or that means, then the coating of the electrode may develop fractures, deteriorating the mechanical strength and moisture permeability of the coating, that is, in the final analysis, its quality.

The best characteristics of heating are offered by the induction method of heat supply, in which the coating of the welding electrode is heated from the inside due to the excitation of strong eddy currents in the rod of the electrode warming this rod. As a result of heating the rod in this manner, the coating of the electrode is heated from the inside, which contributes to the more intensive removal of moisture from the coating and to a considerable increase in the rate of drying, the rate of drying being accelerated, in a general case, from 3 to 12 times.

Also known in the prior art are apparatus for drying and calcinating coated welding electrodes using the induction method of heating. One of such apparatus for drying and calcinating coated welding electrodes with the use of induction heating (see, for example, F.R.G. Pat. No. 1565293 issued Mar. 30, 1972), which is closely related in its technical essence to the proposed apparatus, comprises a chamber having a slot induction heater arranged thereinside which is designed for heating the welding electrodes and provided with a chain conveyer designed for conveying the electrodes being thermally treated along the length of the horizontally arranged slot of the induction heater and furnished further with an arrangement for loading the electrodes with a raw coating thereinto and an arrangement for unloading therefrom the electrodes with a thermally treated coating.

The slot induction heater of the above prior art apparatus has a zigzag shape and designed as a sectionalized structure in length. Each of its sections is made up from a few bus-bars arranged in parallel to which an electric current of the same magnitude is applied and which have a different width, as a result of which the density of the current flowing through the side electroconductive bus-bars is one and a half times as much as the density of the current flowing through the middle electroconductive bus-bars. The chain conveyer, also having a zigzag shape reproducing the shape of the slot induction heater, comprises two endless double-strand chains of the bush-roller type arranged in parallel and provided with a plurality of pairs of clamping holders, which may be designed also as magnetic holders, one chain being fitted with stationary clamping elements of each of the pairs of the electrode holders, while the other chain is fitted with spring clamping elements of the aforesaid pairs, and each of these elements embracing one of the ends of the electrode being held. Each of the arrangements for loading and unloading disposed in the terminal portions of the chain conveyer represents a drum having transverse grooves for receiving the coated welding electrodes, the drum of the unloading arrangement being provided with a means for removing the thermally treated welding electrodes from the chain conveyer.

In this apparatus the holders of the electrodes of the chain conveyer are located, while the electrodes are passing through the slot induction heater, in the space of the slot of the heater, that is, in the zone of action of the highest temperatures created thereby, while the chains of the conveyer are located in direct proximity to the foregoing zone. Consequently, as in the case of the above-described apparatus, the elements of the chain conveyer and, in particular, the electrode holders are subjected to the continuous action of high temperatures deteriorating their operating conditions and reducing considerably their service life. Also subjected to the severe temperature action is the hygroscopic material that must be used in the adopted construction of the holders for removing moisture from the coated end of the electrodes embraced by the holder for the purpose of ensuring the proper thermal treatment of this portion. However, it is known that the choice of available temperature-resistant hygroscopic materials is fairly limited.

Furthermore, the location of the electrode holders directly in the slot of the induction heater calls for an increase in the dimensions of the slot, on the one hand, in terms of its width, which requires an unjustified built-up in the consumption of power for achieving the desired temperature of heating, and, on the other hand, in terms of its length, which with the assigned number of the electrodes being simultaneously treated in the apparatus dictates an increase in the overall dimensions of the slot induction heater, and, hence, of the entire apparatus.

While conveying the coated welding electrodes through the slot induction heater, the electrode holders may cause severe abrasion of the surface of the current-feeding bus-bars of the induction heater, which are located in direct proximity thereto. Also subjected to substantial abrasion may be the coating at the ends of the electrodes being conveyed and embraced by the holders. This abrasion results in the formation of significant amounts of dust in the apparatus which may settle down together with the products of wearing of the hygroscopic material of the holders on the coating of the electrodes being thermally treated. The dust including metal and other materials and deposited and thermally consolidated on the coating of the welding electrodes impairs, on the one hand, the commercial aspect of the finished welding electrodes, and, on the other hand, may result in spoilage of the welds performed by these electrodes.

It should be also noted that the construction of the chain conveyer consisting of the two parallel-arranged chains between which are located the welding electrodes being conveyed compels supplying to the foregoing conveyer the electrodes, of a stringently preassigned length with a relatively small tolerance. Consequently, this may call for the incorporation of an additional appliance into the apparatus for grading the electrodes being delivered to the conveyer to their length.

Finally, should even a single electrode fall by chance out of the holders in the apparatus under consideration, it may lead, due to the horizontal arrangement of the slot of the induction heater, to the collapse of many electrodes, which is accompanied by rejection of these electrodes, as well as by short-circuiting of the electroconductive bus-bars of the induction heater and considerable damage to these bus-bars, which results in shutting down the apparatus and calls for replacing the damaged bus-bars.

SUMMARY OF THE INVENTION

It is an object of the present invention to provide an apparatus for drying and calcinating coated welding electrodes with the use of induction heating, ensuring the increased temperature of calcination of the coating of the electrodes.

Another object of the present invention is to provide an apparatus of the above-mentioned designation enabling heating and calcinating the coating of welding electrodes in a uniform manner along the entire length of the electrode coating.

Still another object of the present invention is to provide an apparatus of the above-mentioned designation ensuring the decreased temperature of heating of the holders for coated welding electrodes as well as of the means for conveying the same.

Still another object of the present invention is to provide an apparatus of the above-mentioned designation wherein the possibility of severe co-impacts between the coated welding electrodes treated, as well as between the same and the elements of the apparatus along the entire path of conveying these electrodes through the apparatus, is reduced to a minimum.

Still another object of the present invention is to provide an apparatus of the above-mentioned designation ensuring the possibility of establishing a minimum spacing between the coating of the welding electrodes located in the slot of an induction heater and the electroconductive bus-bars of the same.

Still another object of the present invention is to improve the quality of the coating of the welding electrodes manufactured by the foregoing apparatus.

Still another object of the present invention is to increase the service life of the foregoing apparatus.

Still another object of the present invention is to raise the output of the foregoing apparatus.

Still another object of the present invention is to broaden the range of coated welding electrode types which may be treated by the foregoing apparatus.

Still another object of the present invention is to reduce the power consumed by the foregoing apparatus.

Still another object of the present invention is to improve the convenience of exploiting the foregoing apparatus.

Still another object of the present invention is to decrease the overall dimensions of the foregoing apparatus.

With these and other objects in view, there is provided an apparatus for drying and calcinating coated welding electrodes with the use of induction heating, comprising a slot induction heater designed as a structure sectionalized in length having in each section thereof electroconductive bus-bars of a different width conveying a current of the same magnitude, a width of the middle electroconductive bus-bars exceeding substantially a width of the side electroconductive bus-bars, a chain conveyer which carries a plurality of magnetic holders for holding magnetically the coated welding electrodes and conveys the coated welding electrodes inside the slot of the induction heater along the entire length thereof, and an arrangement for loading the coated welding electrodes into the chain conveyer and an arrangement for unloading the aforesaid welding electrodes therefrom, both of said arrangements being disposed adjacent to the terminal areas of the chain conveyer, wherein, according to the invention, the slot induction heater has a vertically arranged slot, the magnetic holders are secured to the chain conveyer so that, while conveying the coated welding electrodes held by the magnetic holders inside the slot of the induction heater, the magnetic holders are arranged above the aforesaid slot, each of the magnetic holders is designed as a magnetic system incorporating a magnetic circuit embracing a permanent magnet with a pole piece, a width of the top side electroconductive bus-bars of the slot induction heater exceeds a width of the bottom side electroconductive bus-bars thereof, or the number of the bottom side electroconductive bus-bars exceeds the number of the top electroconductive bus-bars, the arrangement for loading the untreated coated welding electrodes is provided with a receiving mechanism allowing the coated welding electrodes to be arranged in parallel with a constant spacing exceeding an outer diameter of the coating of the welding electrode and the bare terminal ends of the coated welding electrodes to be delivered directly to the magnetic holders of the chain conveyer, and with a first orientating transporter which is disposed adjacent to the outlet area of the receiving mechanism and has its carrying run arranged in a helical line and designed as a descending structure for transferring the coated welding electrodes held by the bare terminal end by the magnetic holders to a vertical position allowing to convey freely the coated welding electrodes inside the vertically arranged slot of the induction heater, whereas the arrangement for unloading the thermally treated welding electrodes is provided with a second orientating transporter which is disposed adjacent to the outlet area of the chain conveyer and has its carrying run arranged in a helical line and designed as an ascending structure for withdrawing the coated welding electrodes held by the bare terminal end thereof by the magnetic holders from a vertical position, and with a mechanism for removing the coated welding electrodes from the magnetic holders of the chain conveyer.

In the proposed apparatus, all of the operations involving conveying the coated welding electrodes through the apparatus as well as changing the position thereof are accomplished so that the coating of the electrodes does not experience in this process any significant external mechanical actions, and therefore the possibility of damaging the coating is reduced to a minimum. This aspect is particularly important for the electrodes with a lime fluorspar basic coating which is not durable in a raw state. The construction of the apparatus enables to simply and reliably transfer the electrodes to a vertical position, which is the most convenient from many viewpoints for implementing the thermal treatment of the electrodes, and also to bring them back thereafter to their original position. Furthermore, the construction of the apparatus ensures a uniform distribution of the heating temperature along the entire length of the coating of the welding electrode being treated.

The proposed apparatus is also characterized by that the magnetic circuit of each of the magnetic holders of the chain conveyer represents a hollow member which is provided with a slit made in the lower portion thereof along its entire length and accommodates thereinside a permanent magnet with a pole piece disposed with a clearance inside the aforesaid slit and extending beyond the outer surface of the magnetic circuit, the pole piece being provided with a plurality of serrations, each of which is designed for holding magnetically one coated welding electrode and which are arranged along the length of a line orientated in the direction of travelling of the chain conveyer and with a constant pitch exceeding an outer diameter of the coating of the welding electrode, the apexes of each of the serrations being chamfered with a chamfering radius at the point of contact of the aforesaid serration with the surface of the bare portion of the coated welding electrode being smaller than a diameter of the rod of the aforesaid electrode and providing substantially a mechanical point contact of the serration apex with the aforesaid surface, whereas the spacing between the neighbouring serrations of the pole pieces of any two adjacent magnetic holders mounted on the chain conveyer being equal to the pitch of the serrations of the pole piece of each magnetic holder.

The above-described construction of the magnetic holders providing a mechanical point contact between the apex of each serration thereof and the surface of the bare portion of the coated welding electrode held thereby allows, on the one hand, without breaking this contact to transfer the electrode from a horizontal position to a vertical one and to keep on holding reliably the electrode thereafter only by its end face. On the other hand, owing to the aforesaid point contact, the transfer of heat from the welding electrode being heated to the elements of the magnetic holder is insignificant and therefore the magnetic holders, while the electrodes are conveyed through the slot induction heater, are heated to a temperature considerably less than the temperature of the heated electrode, as a result of which their magnetic properties remain practically unimpaired.

In the proposed apparatus the receiving mechanism of the loading arrangement represents a feeding transporter and mounted thereon are plates with transverse grooves disposed with a constant spacing exceeding an outer diameter of the coating of the welding electrode and intended for receiving the thermally untreated coated welding electrodes with their bare terminal ends facing one and the same side supplied externally into the aforesaid arrangement, the carrying run of the receiving mechanism having an inclined ascending inlet area with an adjustable angle of inclination and a horizontal outlet area arranged at such a level and so in relation to the carrying run of the chain conveyer that the bare terminal ends of the coated welding electrodes lying inside said grooves are capable of being arranged during the time of travelling of the receiving mechanism under the magnetic holders of the chain conveyer.

The above-described construction of the receiving mechanism of the loading arrangement allows receipt of the coated welding electrodes supplied thereinto with any speed, and owing to the possibility of adjusting the angle of inclination of the inlet area of the carrying run of the feeding transporter, it permits receipt of the electrodes without skipping them in a fairly broad range of diameters.

In the proposed apparatus, each of the orientating transporters represents a belt transporter having its carrying run supported by a plurality of rollers arranged in a helical line, and secured to a guiding support designed in the form of a portion of the cylindrical surface whose axis extends parallel to the direction of travelling of the carrying run of the chain conveyer in its terminal areas.

The above-described construction of the orientating transporters ensures turning of each of the coated welding electrodes in relation to the serration of the magnetic holder only in a vertical plane transverse to the direction of travelling of the carrying run of the chain conveyer in its terminal areas, and does not permit the electrodes to perform displacements in other planes. Due to this, the possibility of contacts or co-impacts between the electrodes while they are transferred to a vertical position or therefrom is totally excluded.

In the proposed apparatus, the mechanism for removing the thermally treated coated welding electrodes from the magnetic holders of the chain conveyer incorporates a belt transporter whose inlet area is disposed adjacent to and in series with the outlet area of the second orientating transporter and which serves for conveying the coated welding electrodes beyond the apparatus, and a moving endless pressing belt which is mounted above the inlet area of the belt transporter and whose lower run has the direction of travelling orientated at an angle to the plane of arranging the coated welding electrodes on the belt transporter, the depressed portion of said lower run of the pressing belt being disposed below said plane for disengaging the coated welding electrodes from the magnetic holders of the chain conveyer.

The above-described construction of the removing mechanism allows removal of smoothly the finished coated welding electrodes from the magnetic holders of the chain conveyer during the time of travelling of the aforesaid conveyer, as well as avoiding the skewing and co-impacts of the electrodes.

In one embodiment of the proposed apparatus, a width of the middle electroconductive bus-bars of the slot induction heater is twice larger than a width of its side electroconductive bus-bars, the number of its bottom side electroconductive bus-bars being twice larger than the number of its top side electroconductive bus-bars.

It is expedient to use the above-described construction of the slot induction heater whenever it is necessary to treat thermally the coated welding electrodes with an average length which is employed most frequently, or with an increased length.

In another embodiment of the proposed apparatus, a width of the top side electroconductive bus-bars of the slot induction heater is one and a half times larger than a width of its bottom side electroconductive bus-bars.

It is expedient to use the above-described construction of the slot induction heater whenever it is necessary to treat thermally the coated welding electrodes with a decreased length.

BRIEF DESCRIPTION OF THE DRAWINGS

The foregoing and other objects as well as the salient features and advantages of the present invention will become more apparent from a subsequent consideration of the following detailed description of the proposed apparatus for drying and calcinating coated welding electrodes with reference being made to the accompanying drawings, wherein:

FIG. 4 illustrates a cross-sectional view along the line IV—IV of FIG. 2 of a part of the chain conveyer with a magnetic holder, according to the invention;

FIG. 5 illustrates a side view of the same;

It should be noted that the drawings appended to the description of the invention are made schematically and serve purely for the purpose of elucidating the present invention without any limitations whatsoever imposed on the dimensions of the elements incorporated in the construction of the proposed apparatus for drying and calcinating coated welding electrodes, as well as on the dimensional relationships of these elements and so forth. In different drawings, the same elements have the same numeral references. The arrows appearing near some separate elements show the direction of travelling or rotation of these elements.

DETAILED DESCRIPTION OF THE INVENTION

Figure 1:
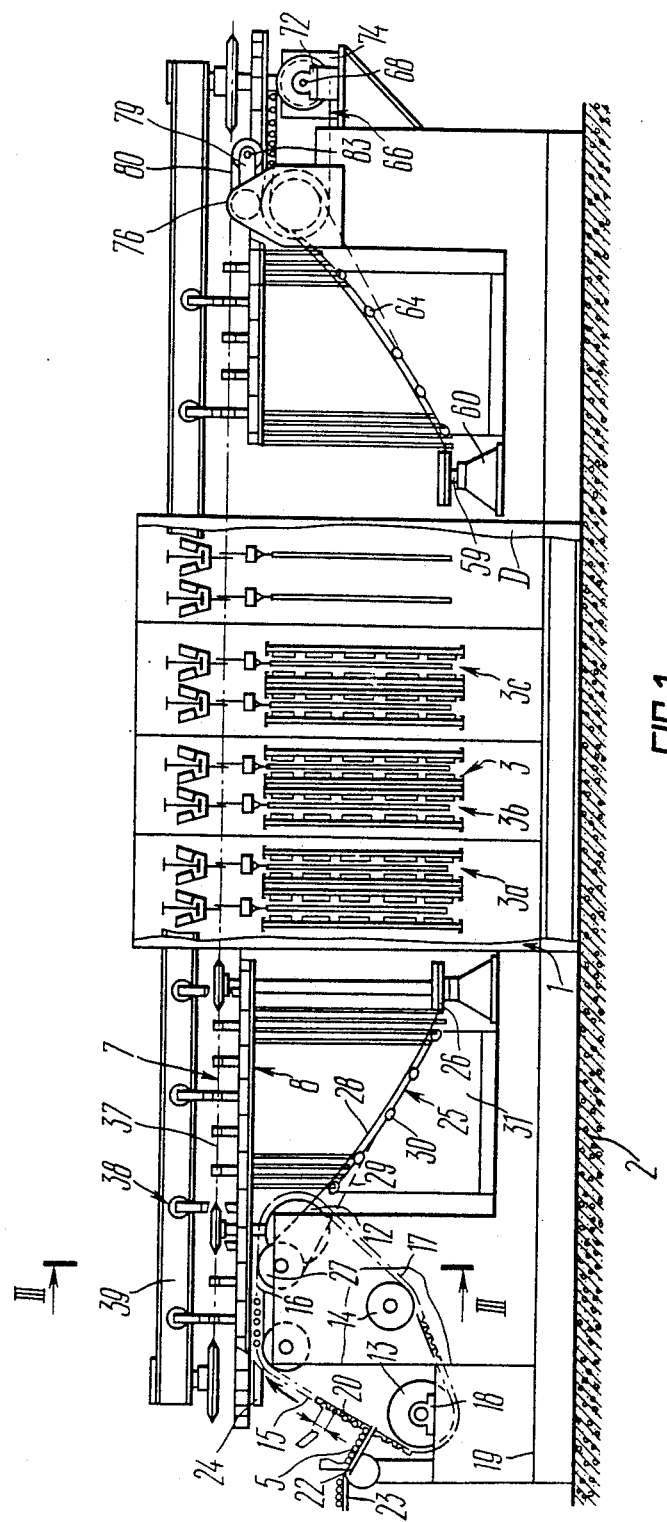
FIG. 1 illustrates a front view of an apparatus for drying and calcinating coated welding electrodes with the use of induction heating, according to the invention.
Figure 2:
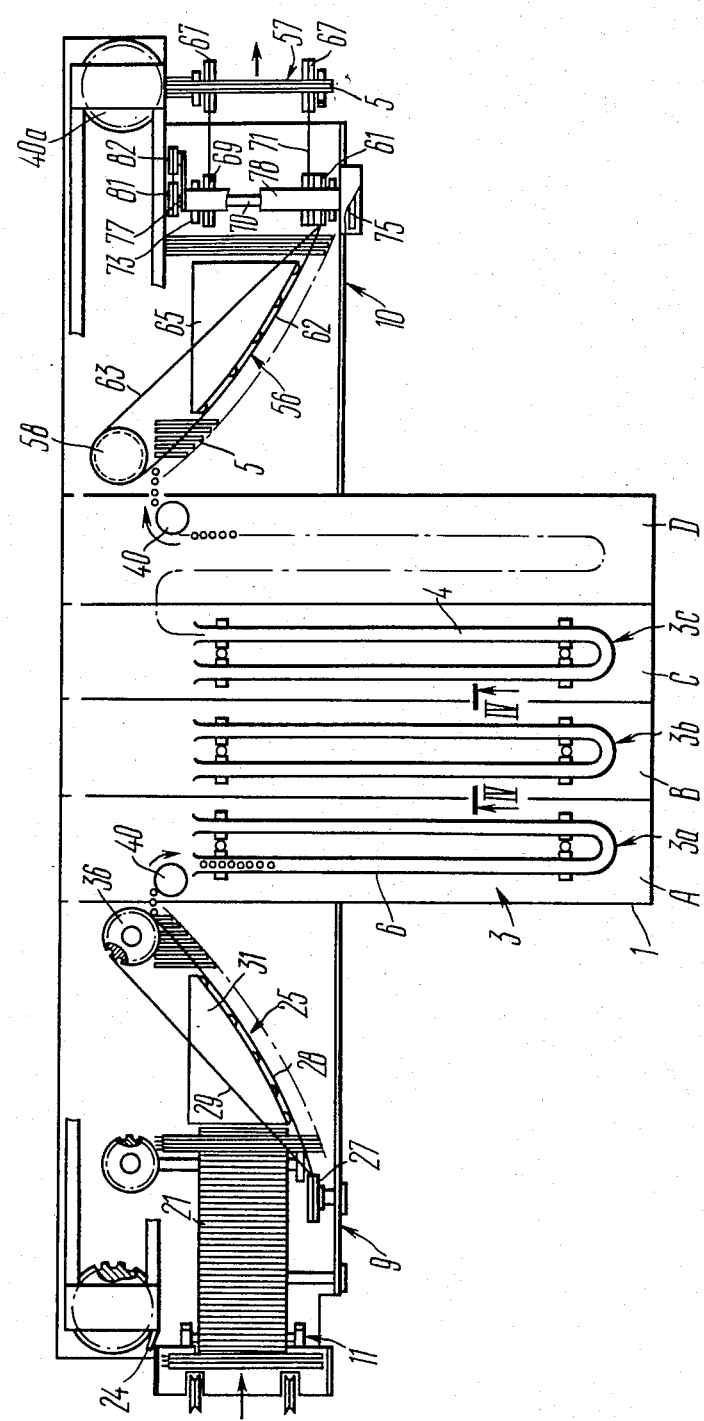
FIG. 2 illustrates a top view of the same.

The apparatus for drying and calcinating coated welding electrodes according to the present invention, using the induction method of heating for treating thermally the electrodes, represents a part of an automatic high-duty production line for manufacturing the aforesaid electrodes. A principal unit of the apparatus is a heating chamber 1 (FIG. 1) which is mounted on a foundation 2 and accommodates a slot induction heater 3. The induction heater 3 has a vertical arrangement of its slot 4 and its walls have a zigzag shape with chamfered curves (FIG. 2). The induction heater is designed as a structure sectionalized in length and incorporates a section 3a which is arranged inside the chamber 1 in its zone A intended for preliminary drying of coated welding electrodes 5, a section 3b which is arranged in the zone B intended for final drying of the electrodes 5, and a section 3c which is arranged in the zone C intended for calcinating of the electrodes 5 subsequent to the drying procedure. The chamber 1 includes further a zone D which serves for cooling of the heated electrodes 5 and which lies beyond the slot induction heater 3. The cooling zone D is provided with a system for air-blowing the electrodes 5 comprising blowers and air ducts which are not shown in the drawing for its simplification. Each section of the slot induction heater 3 is made up from electroconductive bus-bars 6 forming its walls and arranged horizontally a few pieces in height, their shape, number and character of location being discussed hereinbelow in more detail.

The apparatus comprises further an overhead chain conveyer 7 whose carrying run reproduces substantially the shape of the walls of the slot induction heater 3 and which is arranged above the aforesaid induction heater. The chain conveyer 7 carries a plurality of magnetic holders 8 and serves for conveying the electrodes 5 held by the magnetic holders 8 through the entire apparatus and, in particular, for conveying the electrodes 5 in a vertical position inside the slot 4 of the induction heater 3 along the entire length thereof. Adjacent to the terminal areas of the chain conveyer 7, where its carrying run has a rectilinear shape, are disposed an arrangement 9 for loading the electrodes 5 into the chain conveyer 7 and an arrangement 10 for unloading the electrodes 5 from said conveyer.

The arrangement 9 for loading incorporates a receiving mechanism 11 which represents a feeding chain transporter and comprises a drive sprocket 12, a tensioning roller 13 and an additional deflecting roller 14, and also a carrying run with an inclined inlet area 15 of an ascending character, and with a horizontal outlet area 16 and a return run 17. The additional deflecting roller 14 is mounted for producing on the carrying run of the mechanism 11 its inclined area 15 and horizontal area 16. The tensioning roller 13 is mounted on a support 18 capable of moving horizontally whereby the angle of inclination of the ascending inclined area 15 of the carrying run is adjusted. The movable support 18 is mounted on a frame 19 being common to the entire apparatus.

The receiving mechanism 11 carries a plurality of plates 20 with transverse grooves 21 intended for receiving the thermally untreated electrodes 5 supplied into the loading arrangement 9 with their bare terminal ends facing one and the same side. In order to simplify the drawing only a few plates 20 are shown therein, but actually they are disposed with small clearances along the entire length of the carrying member of the mechanism 11. The transverse grooves 21 are disposed on each of the plates 20 with a constant spacing "a" which somewhat exceeds an outer diameter of the coating of the welding electrode 5 and the size of which is to be discussed in more detail hereinbelow. The distance between the axes of the adjacent transverse grooves 21 of any two neighbouring plates 20 mounted on the receiving mechanism 11 is equal to the spacing "a" of the arrangement of the grooves 21 on each plate 20.

Adjacent to the outlet area 16 of the receiving mechanism 11 is mounted an inclined tray 22 whose upper portion is connected to an outlet transporter 23 of the press (not shown) on which the electrodes 5 are coated and which, just as the apparatus being described, forms a constituent part of the production line for manufacturing the coated welding electrodes of the above type. The tray 22 allows supply of the electrodes 5 from the outlet transporter 23 to the receiving mechanism 11.

Adjacent to the initial section of the horizontal area 16 of the receiving mechanism 11 on the side thereof where the bare terminal ends of the electrodes 5 in the area 16 are facing, is mounted a plate 24 for levelling the position of the electrodes 5 in this area. The levelling plate 24 is mounted at a small angle to the direction of travelling of the horizontal area 16 and ensures such a position of the electrodes 5 in this area in which the end faces of the bare terminal ends of the electrodes 5 are arranged in one line.

The loading arrangement 9 also comprises a first orientating transporter 25 which is disposed adjacent to the terminal section of the outlet area 16 of the receiving mechanism 11 so that the initial area of the transporter 25 is arranged parallel to the aforesaid terminal section. The orientating transporter 25 represents a belt transporter which uses a V-belt as a carrying member. The orientating transporter 25 incorporates a drive pulley 26 and a tensioning pulley 27, and also a carrying run 28 and a return run 29. The carrying run 28 of the orientating transporter 25 is designed as descending and arranged in a helical line. The latter is achieved by laying the carrying run 28 on rollers 30 secured to a guiding support 31 made in the form of a portion of the cylindrical surface whose axis extends parallel to the direction of travelling of the carrying run of the chain conveyer 7 in its rectilinear inlet terminal area, adjacent to which is disposed the loading arrangement 9.

Figure 3:
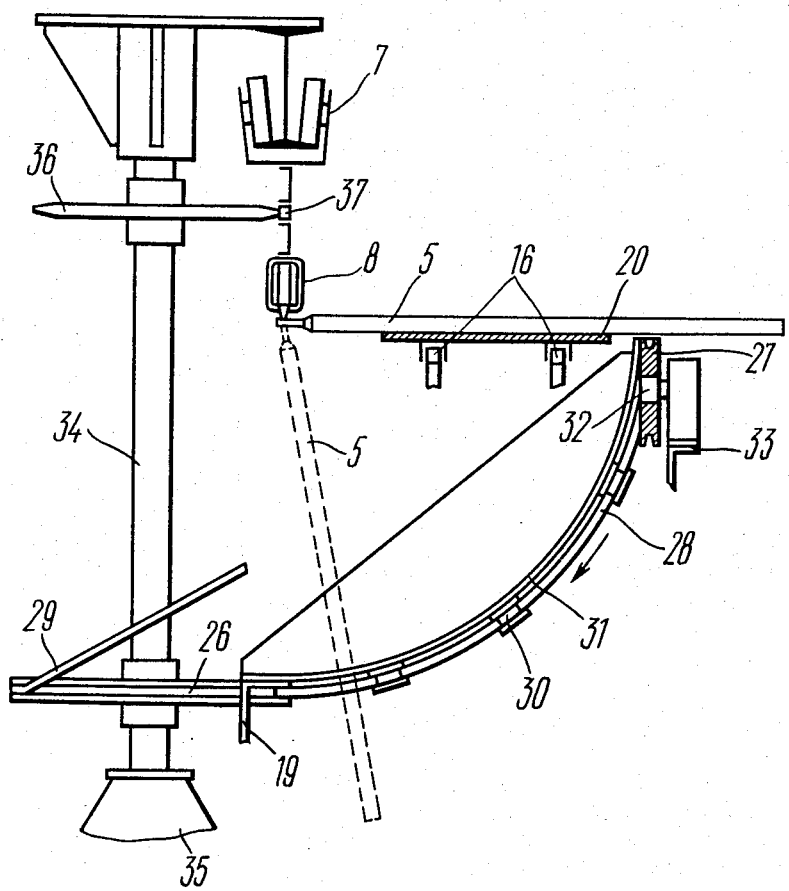
FIG. 3 illustrates a sectional view along the line III—III of FIG. 1 of the orientating transporter of a loading arrangement, as viewed from the side of the receiving mechanism of said arrangement, according to the invention.

A more lucid notion about the construction of the orientating transporter 25 and its arrangement in relation to the horizontal outlet area 16 of the receiving mechanism 11 may be obtained upon referring to FIG. 3, wherein the transporter 25 is shown from the side of the receiving mechanism 11. When considering the drawing it may be seen that the upper initial area of the carrying run 28 of the transporter 25 (this area is located in space closer to the viewer, while the lower terminal area of the run 28 is more remote from the viewer) is arranged in level with the plates 20 mounted on the horizontal outlet area 16 of the receiving mechanism 11. In turn, the horizontal outlet area 16 of the mechanism 11 is arranged at such a level and so in relation to the carrying run of the chain conveyer 7 that the bare terminal ends of the welding electrodes 5 lying on the plates 20 are arranged under the magnetic holders 8 of the chain conveyer 7 in direct proximity from the lower edge of the aforesaid magnetic holders. The guiding support 31 may be made simply as a metal sheet in the form of a rectangular triangle bent so that the hypotenuse of this triangle forms a portion of the helical line with the required angle of elevation equal, in particular, to a quarter of a turn of such a line. The bent sheet is mounted so that the long lower side of the triangle is secured to the frame 19, while its short side together with the hypotenuse is projected into the plane of the drawing in the form of a portion of the circumference of its lower right quadrant. The tensioning pulley 27 of the orientating transporter 25 is fitted by a bearing onto an axis 32 mounted on a support 33, while the drive pulley 26 is fitted onto a shaft 34 mounted with one end thereof in a thrust bearing on a support 35. On the other end of the shaft 34 is fitted a sprocket 36 being in engagement with a chain 37 of the overhead chain conveyer 7. A design diameter of the drive pulley 26 is chosen to be greater than a diameter of the initial circumference of the sprocket 36. The value of the elevation angle of the helical line of the guiding support 31 and the ratio of the diameters of the drive pulley 26 and the sprocket 36 are to be discussed in more detail hereinbelow.

The overhead chain conveyer 7 (FIG. 1) comprises an endless chain 37 of the bush-roller type secured to moving carriages 38 mounted on a riding beam 39. The latter in its terminal areas, namely, at the arrangement sites of the loading arrangement 9 and the unloading arrangement 10, has a rectilinear shape, and in the area disposed above the slot induction heater 3 has a zigzag shape reproducing the curves of the aforesaid induction heater (see FIG. 2). The chain 37 is in engagement with a few drive sprockets 40 connected to a transmission drive (not shown) ensuring the synchronized rotation of all these sprockets as well as the possibility of adjusting the speed of their rotation. Secured to the chain 37 is a plurality of the magnetic holders 8 (FIG. 1) which are arranged in series along the length of the chain 37 with a small clearance therebetween. In order to simplify the drawing, in FIG. 1 only a few magnetic holders 8 are shown. The construction of the moving carriage 38 and of the magnetic holder 8 is shown in a more detailed manner in FIG. 4 and in FIG. 5.

When referring to FIG. 4 showing a part of the chain conveyer 7 with a cross section made in its riding beam 39, it may be seen that the moving carriage 38 incorporates rollers 41 mounted on the horizontal flanges of the beam 39 and interconnected by a clamp 42. The chain 37 having folded plates 43 is secured with one side thereof by means of the aforesaid plates to the clamp 42. Secured to the folded plates 43 of the other side of the chain 37 are the magnetic holders 8.

Each of the magnetic holders 8 represents a magnetic system incorporating a magnetic circuit 44 and embraced thereby a permanent magnet 45 with a pole piece 46 provided with a plurality of serrations 47. The magnetic circuit 44 is designed as a hollow member, provided with a slit 48 made in the lower portion thereof along its entire length and accommodates thereinside the permanent magnet 45. The pole piece 46, namely its serrations 47 are arranged inside the slit 48 with a small clearance and extend beyond the outer surface of the magnetic circuit 44 for some distance "b" which is to be discussed in more detail hereinbelow. The magnetic holder 8 is fastened to form an integral structure by means of screws 49 and connected to the folded plates 43 of the chain 37 by means of an angle piece 50. The magnetic holders 8 are suspended from the chain 37 at such a height in relation to the slot induction heater 3 that the spacing between the serrations 47 and the top electroconductive bus-bars 6 of the induction heater 3 does not exceed the length of the bare portion of the welding electrodes 5 being held by the aforesaid holders.

As shown in FIG. 5, the magnetic circuit 44 and the permanent magnet 45 accommodated thereinside have an elongated shape, the number of the serrations 47 of the pole piece 46 being determined, with the chosen specific length of the permanent magnet 45, by a diameter of the thickest coating of the welding electrode from a set of the electrodes which may be treated by the apparatus. On the other hand, a length of the permanent magnet 45 and accordingly of the entire magnetic holder 8 is chosen, firstly, with allowance made for the chamfering radius of the zigzag slot induction heater 3 which should be of a minimum size so as to decrease the overall dimensions of the apparatus, and, secondly, starting from the condition that the magnetic holders 8 must move freely with the electrodes 5 suspended therefrom along these chamfered elements.

Each of the serrations 47 is intended for holding one coated welding electrode 5. The serrations 47 are arranged along a line orientated in the direction of travelling of the chain conveyer 7, and with a constant pitch "c". The pitch "c" exceeds somewhat an outer diameter of the coating of the electrode 5 and equals precisely to the pitch "a" of the arrangement of the transverse grooves 21 on the plates 20. The pitch "c" and the pitch "a" equal thereto are chosen on the basis of the ratio $a = c \geq 1.2D$, where D is an outer diameter of the coating of the electrode 5. The ratio is determined experimentally with allowance made for the longitudinal curvature of the electrodes 5 within a tolerance for this curvature and ensures a minimum clearance between the coatings of the electrodes 5 being held, under which these electrodes do not collide. The apexes of each of the serrations 47 are chamfered with a radius at the point of contact of the serration 47 with the surface of the bare portion of the coated welding electrode 5 being smaller than a diameter of the rod of the aforesaid electrode. The chamfered apex of each of the serrations 47 with the above-specified chamfering radius ensures substantially a mechanical point contact of the apex with the surface of the welding electrode 5. It should be noted here that in a general case the apex of each of the serrations 47 may represent a portion of any convex surface of the second order including a sphere, a parabola and so forth. The magnetic holders 8 are arranged along the chain 37 so that the spacing between the neighbouring serrations 47 of any two adjacent holders 8 is equal to the pitch "c" of the serrations 47 of each such a holder.

The above-described construction of the magnetic holder 8 with the hollow magnetic circuit 44 accommodating the permanent magnet 45 with the serrations 47 ensures a maximum force of magnetic attraction of the electrodes 5 to the apexes of the serrations 47, and also the same magnetic polarity of all the serrations 47, which precludes the possibility of adhesion of the electrodes 5 to one another.

Figure 6:
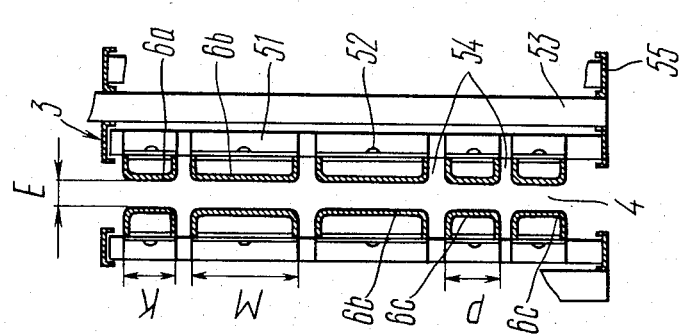
FIG. 6 illustrates a cross-sectional view of a part of the slot induction heater incorporating electroconductive bus-bars, according to one embodiment of the invention.
Figure 7:
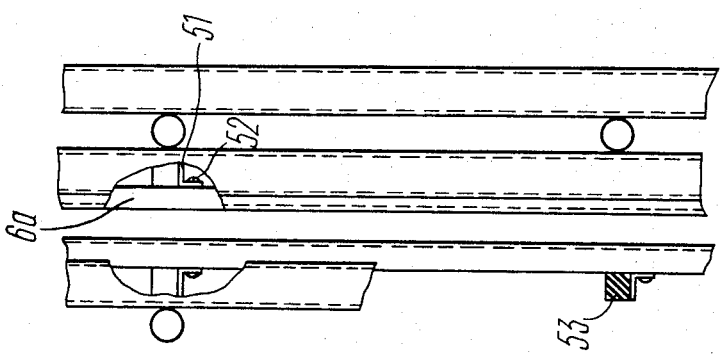
FIG. 7 illustrates a top view of the same.

As was stated hereinabove, each section of the slot induction heater 3 (FIG. 1) is made up from the electroconductive bus-bars 6 (see FIG. 6) arranged horizontally a few pieces in height which form two vertical walls parallel to each other of the induction heater. The electroconductive bus-bars 6 in each section of the induction heater 3 are placed in series and connected to a high-frequency converter which is not shown in the drawing, and a high-frequency current of the same magnitude is passed through the electroconductive bus-bars 6 of one section. The electroconductive bus-bars 6 are manufactured from an aluminum alloy and each of them is shaped like a channel, as shown in FIG. 6. The above-specified shape of the electronductive bus-bars 6 ensures their high mechanical strength which provides in turn a preassigned width "E" of the vertical slot 4 equal along the entire length of the induction heater 3. The electroconductive bus-bars 6 in each section of the induction heater 3 are secured by means of angle pieces 51 and screws 52 to vertical poles 53 manufactured from an electrically insulating material (see also FIG. 7). Provided between the electroconductive bus-bars 6 (FIG. 6) is a clearance 54 preventing their short-circuiting. The vertical electrical insulating poles 53 are mounted in box supports 55 secured in the heating chamber 1 (FIG. 1).

In the slot induction heater 3 of the apparatus according to the present invention the electroconductive bus-bars 6 (FIG. 6) in each section of this induction heater, in a general case, have a different width, a width "M" of the middle bus-bars $6b$ being essentially greater than a width "K" or "P" of its side bus-bars $6a$ or $6c$. Furthermore, in the proposed apparatus the distribution of the total density of the electric current in the electroconductive bus-bars 6 of each section of the slot induction heater 3 is asymmetrical to the central horizontal line of the walls of the induction heater formed by the aforesaid bus-bars. More specifically, the total density of the current in the top side bus-bars 6a is always smaller than the total density of the current in the bottom side bus-bars 6c. This is achieved by that with one and the same magnitude of the electric current in each of the bus-bars 6 either the number of the bottom bus-bars 6c is chosen greater than the number of the top bus-bars 6a (FIG. 6) or a width "K" (FIG. 8) of the top side bus-bars 6a is chosen greater than a width "P" of the bottom side bus-bars 6c.

In one embodiment of the slot induction heater 3 (FIG. 6) a width "M" of its middle electroconductive bus-bars 6b is twice greater than a width "K" or "P" of its top 6a or bottom 6c electroconductive bus-bars, the number of the bottom side electroconductive bus-bars 6c of the induction heater 3 being twice greater than the number of its top side electroconductive bus-bars 6a.

In another embodiment of the slot induction heater 3 (FIG. 8) a width "K" of its top side electroconductive bus-bars 6a is one and a half times greater than a width "P" of its bottom side electroconductive bus-bars 6c.

The arrangement 10 (FIG. 1) for unloading from the chain conveyer 7 the coated welding electrodes 5 thermally treated in the slot induction heater 3 incorporates a second orientating transporter 56 and a mechanism 57 for removing the electrodes 5 from the magnetic holders 8 of the aforesaid conveyer. The orientating transporter 56 is disposed adjacent to the outlet area of the chain conveyer 7, while the removing mechanism 57 is disposed adjacent to the outlet area of the orientating transporter 56. The orientating transporter 56 is intended for transferring the thermally treated electrodes 5 suspended by the bare terminal end from the magnetic holders 8 from a vertical position to a horizontal one.

The orientating transporter 56 of the unloading arrangement 10 represents, as the orientating transporter 25 of the loading arrangement 9, a belt transporter which uses a V-belt as its carrying member. The orientating transporter 56 incorporates a driven pulley 58 fitted by a bearing onto an axis 59 mounted on a support 60 and a drive pulley 61 (FIG. 2), and also includes a carrying run 62 and a return run 63. The carrying run 62 of the orientating transporter 56 is designed as ascending and arranged in a helical line forming, as in the orientating transporter 25, a quarter of a turn of the aforesaid line. The latter is achieved here, as in the orientating transporter 25, by laying the carrying run 62 on rollers 64 secured to a guiding support 65 designed in the form of a portion of the cylindrical surface whose axis extends parallel to the direction of travelling of the carrying run of the chain conveyer 7 in its rectilinear terminal outlet area, adjacent to which is disposed the unloading arrangement 10.

The removing mechanism 57 of the unloading arrangement 10 incorporates a belt transporter 66 whose inlet area is disposed adjacent to and in series with the outlet area of the orientating transporter 56 and which serves for conveying the electrodes 5 transferred by the orientating transporter from a vertical position to a horizontal one beyond the limits of the apparatus being described. The belt transporter 66 is provided with drive pulleys 67 mounted on a shaft 68, and driven pulleys 69 mounted on a shaft 70, and also includes a carrying member 71. The shaft 68 is mounted on supports 72, while the shaft 70 is mounted on supports 73 secured to the frame 19. The shaft 68 of the drive pulleys 67 is connected by a reduction gear 74 to the sprocket 40a of the chain conveyer 7, the reduction gear 74 being designed so that the direction and speed of travelling of the belt transporter 66 are the same with the direction and speed of travelling of the outlet area of the chain conveyer 7. Also mounted on the shaft 70 is the drive pulley 61 of the orientating transporter 56, a design diameter of the drive pulley 61 being greater than the same diameter of the pulleys 69 mounted on the aforesaid shaft, which will be discussed in more detail hereinbelow. The shaft 70 is also connected to a reduction gear 75 arranged in a case 76 and provided with an output shaft 77 passing through a tubular support 78 which is secured to the case 76, extends its cantilever toward the belt transporter 66 and disposed thereabove. Secured to the free end of the tubular support 78 is a bracket 79 which extends in the direction of travelling of the belt transporter 66 and which will be discussed in more detail hereinbelow.

The removing mechanism 57 incorporates further an endless rotatory pressing belt 80 mounted on a drive pulley 81 fitted onto the end of the output shaft 77 of the reduction gear 75, and on a driven pulley 82 fitted onto an axis 83 which is secured to the aforesaid bracket 79. The pressing belt 80 is arranged above the inlet area of the belt transporter 66 so that the direction of travelling of its lower run is at a small angle to the plane of the arrangement of the electrodes 5 on the belt transporter 66. In relation to the electrodes 5 placed on the belt transporter 66 the pressing belt 80 is arranged so that the depressed portion of its lower run is disposed under the plane of the arrangement of the electrodes 5 on the aforesaid transporter. More specifically, the lower run of the pressing belt 80 is disposed above the section wherein the electrodes 5 are coated and which is disposed adjacent to the bare terminal end of the electrodes 5.

Thus, in the unloading arrangement 10 the belt transporter 66 is set in motion by means of the reduction gear 74 from the sprocket 40a of the chain conveyer 7, while from the driven pulleys 69 of the aforesaid transporter 66 set in motion by means of the pulley 61 is the orientating transporter 56, and by means of the reduction gear 75, its output shaft 77 and pulley 81 set in motion is the endless pressing belt 80.

The proposed apparatus for drying and calcinating coated welding electrodes is operating as follows.

The welding electrodes 5 (FIG. 1) with a raw coating are supplied in a horizontal position from the press (not shown) serving for applying this coating thereto by its outlet transporter 23 to the inclined tray 22 and slide along this tray downward. Since the lower cut of the tray 22 is disposed in direct proximity to the surface of the plates 20 of the receiving mechanism 11, the electrode 5 located at the very bottom of the tray 22 finds its way into one of the transverse grooves 21 of one of the plates 20. Subsequent to setting in motion the chain conveyer 7, the receiving mechanism 11 kinematically connected thereto and the orientating transporter 25 of the loading arrangement 9 begin to move in step with the aforesaid conveyor. As a result, the inclined inlet area 15 of the carrying run of the receiving mechanism 11 moves upward, and as it moves, the transverse grooves 21 of each of the plates 20 are filled with the electrodes 5, only one electrode 5 being received by each of the grooves 21. The angle of inclination of the ascending area 15 of the carrying run of the receiving mechanism 11 may vary in the range from 45° to 75° by means of moving the support 18, which allows to load into the receiving mechanism 11 batches with the electrodes 5 having different diameters of the rod, for example, with diameters ranging from 3 to 6 millimeters.

After the plates 20 loaded with the electrodes 5 have reached the horizontal area 16 of the carrying run, the horizontally positioned electrodes 5 come up in succession to the magnetic holders 8 moving thereabove and suspended from the chain 37 of the conveyer 7, the electrodes 5 facing in this process the magnetic holders 8 with their bare terminal ends. Since the chain conveyor 7 and the receiving mechanism 11 move in unison so that each transverse groove 21 of the plates 20 is always disposed exactly under one of the serrations 47 of the magnetic holders 8, then, as the lateral surface of the bare terminal end of each of the electrodes 5 is brought closer to the apex of one of the serrations 47, the electrodes 5 are pulled one by one to these serrations with contact at one point.

In the horizontal area 16 of the carrying run of the receiving mechanism 11 the electrodes 5 held by the magnetic holders 8 are conveyed without any displacements in relation to the plate 20 and without any contacts therebetween. At the end of the horizontal outlet area 16 the electrodes 5 being conveyed lie down with their coated portion on the belt of the first orientating transporter 25 in the initial section of its carrying run 28. As the orientating transporter 26 moves, the coated end of the electrodes 5 moves together with its belt in a helical path downward, while the bare terminal end of the electrodes 5 turns in relation to the apex of the serration 47 of the magnetic holder 8 without losing mechanical contact therewith. Due to the movement of each of the electrodes 5 in such a path, they are transferred smoothly by gravity from a horizontal position to a vertical one and in the terminal section of the carrying run 28 of the transporter 25 they turn out freely suspended with the face point of its bare terminal end from the serrations 47 of the magnetic holders 8, only one electrode 5 being suspended from each of the serrations 47.

It should be noted here that over the entire way of transference of the electrodes 5 from a horizontal position to a vertical one the electrodes 5 are held exactly in the planes perpendicular to the direction of travelling of the magnetic holders 8, whereby the spacings between the electrodes 5, at which they were previously arranged inside the transverse grooves 21 of the plates 20, are maintained invariable. In other words, while the electrodes 5 are turning, they cannot come in contact with one another or perform any displacements in relation to the belt of the orientating transporter 25. Such a smooth and well-aligned turning of the electrodes 5 is accomplished due to travelling of the carrying run 28 of the transporter 25 in a helical path at a speed which exceeds by 6 percent the speed of travelling of the chain conveyer 7 with the magnetic holders 8, whereto the electrodes 5 are bound by magnetic forces. The aforesaid choice of the travelling speed of the orientating transporter 25 is based on the following.

The matter is that the travelling speed of the orientating transporter 25 is determined, first of all, by the elevation angle of the helical line along which the carrying run 28 of the transporter is travelling, and preassigned to be such that the speed of motion of the coated ends of each of the electrodes 5 located on the aforesaid run in the direction of travelling of the magnetic holders 8 is always equal to the travelling speed of these holders. This is necessary in order to keep the electrodes 5, while they are located on the transporter 25, invariably in the parallel planes perpendicular to the aforesaid direction of travelling of the magnetic holders 8. The elevation angle of the helical line is pre-assigned from the condition of excluding the possibility of sliding of the electrodes 5 over the belt of the transporter 25, and determined in turn by the friction angle depending on the friction coefficient between the material of the belt and the electrode 5.

In the proposed apparatus, the elevation angle of the helical line in the first orientating transporter 25 is chosen, with allowance made for the above-stated, to be equal to about 70°. In order to ensure a 6 percent increase in the travelling speed of the carrying run 28 of the transporter 25 as compared to the travelling speed of the chain conveyor 7, a design diameter of the driven pulley 26 is chosen to be greater by the same 6 percent than a diameter of the initial circumference of the sprocket 36 set in motion due to its engagement with the chain 37 of the chain conveyor 7. Similarly, in the second orientating transporter 56 the elevation angle of the helical line, along which arranged is its descending carrying run 62, is chosen to be equal to 70°, and a design diameter of the drive pulley 61 of its transporter is also chosen to be greater by 6 percent than a design diameter of the pulleys 69 from which the pulley 61 is rotated and which are connected by the reduction gear 74 to the sprocket 40a of the chain conveyer 7.

The possibility of the above-described transference of the electrodes 5 from a horizontal position to a vertical one is ensured in the proposed apparatus not only by the construction and the nature of the operation of the orientating transporter 25 described hereinabove, but also by the construction of the magnetic holder 8 which was also disclosed hereinabove. More specifically, turning of the bare terminal end of the electrode 5 in relation to the serration 47, which is accomplished at the time of the aforesaid transference with sliding of the apex of the serration 47 over the peripheral surface of the aforesaid end and with movement of the aforesaid apex to its face surface without losing continuous mechanical contact of the apex with the surface over which it is sliding, becomes possible because the serrations 47 extend beyond the outer surface of the magnetic circuit 44 to the distance "b" mentioned hereinabove. The distance "b" is chosen within the ratio $b = 0.1 \div 1.0\, D$, where D is an external diameter of the coating of the electrode 5. The specific value of the distance "b" is determined experimentally and depends on the specific diameter of the electrode 5, on the materials from which the elements of the magnetic circuit 44 are manufactured and so forth. The minimum value of the distance "b", stated in the above ratio is derived from the condition of maintaining contact of the peripheral surface with the apex of the serration 47 with allowance made for the available irregularities and curvature of the rod of the electrode 5 within it manufacturing tolerances. The above-specified maximum value of the distance "b" is dictated by the condition of reliable shifting of the apex of the serration 47 from the peripheral surface to the face surface of the bare terminal end of the electrode 5 by the action of its own gravity forces. The execution of the apex of the serration 47 in the form of, as was stated hereinabove, a portion of the convex surface of the second order, for example, a portion of a paraboloid, hyperboloid and the like, ensures a mechanical point contact of the apex of the serration 47 with the surface of the bare terminal end of the electrode 5.

After the electrodes 5 with a raw coating have been successively transferred to a vertical position, they are supplied in a suspended state to the heating chamber 1. Inside the chamber 1, the electrodes 5 are conveyed between the walls of the slot induction heater 3 and subjected thereinside to gradual induction heating due to the induction of eddy currents in the metal rod of each of the electrodes. The electrodes 5 in the heating chamber 1 pass in succession through the preliminary drying zone A (in the area of the section 3a of the induction heater 3), the final drying zone B (the section 3b) and the calcinating zone C (the section 3c). The time of residence of the electrodes 5 in the preliminary drying zone A is established depending on the specific diameter of the rod of the electrodes 5, the composition of the material, their coating, the thickness of this coating, and on the pre-assigned drying rate. In a zone A initial removal of the moisture from the raw coating of the electrodes 5 is effected. The raw coating of the electrodes 5 is subjected in the zone A not only to heating from the inside from the rod of the electrode 5 being heated by the eddy currents, but also to external heating by blowing with heated air by means of system (not shown) of supplying air from air heaters (not shown) located outside the apparatus. The combined heating prevents the formation of fractures in the coating of the electrodes 5 being heated.

In the final drying zone B the electrodes 5 are subjected only to induction heating. In the zone B through the bus-bars 6 of the section 3b of the slot induction heater 3 is passed a high-frequency current of the magnitude greater than that passed in the zone A through the bus-bars 6 of its section 3a, owing to which the residual moisture present in the coating of the electrodes 5 is completely removed in this zone.

In the calcinating zone C to the bus-bars 6 of the section 3c of the slot induction heater 3 is applied a current of the magnitude even greater ensuring a maximum temperature of heating of the electrodes 5 to values from 450° to 500° C. While the electrodes 5 are thus heated, the particles of the material of their coating are caked and the coating acquires consequently the required degree of hardness.

From the calcinating zone C, the electrodes 5 are conveyed to the cooling zone D. In the zone D the electrodes 5 heated in the preceding zones are cooled by means of a suitable system (not shown) of air blowing to a temperature of about 40° C.

Figure 8:
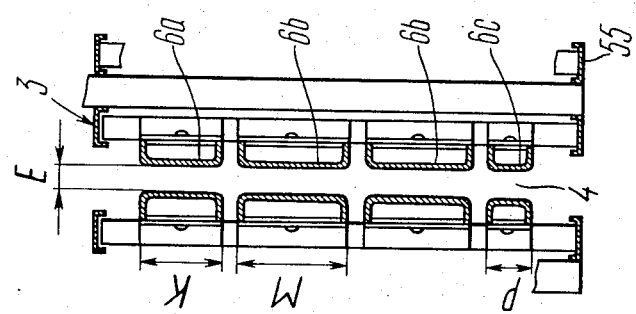
FIG. 8 illustrates a cross-sectional view of a part of the slot induction heater incorporating electroconductive bus-bars according to another embodiment of the invention.

The operation of the embodiment of the slot induction heater 3, whose electroconductive bus-bars 6 are shown in FIG. 3, does not differ substantially from the operation of its embodiment with the aforesaid electroconductive bus-bars shown in FIG. 8. However, in both of the embodiments of the slot induction heater 3 a width of the electroconductive bus-bars 6, their number and the character of the arrangement in each section of the slot induction heater 3 are pre-assigned so that the total electromagnetic field created by the bus-bars 6 ensure a uniform distribution of the temperature of induction heating of the rods of the electrodes 5 over the entire length of each of them. Owing to this, the ready-for-use coated welding electrodes 5 leaving the chamber 1 of the proposed apparatus exhibit an excellent quality of their coating, namely, a high degree of mechanical strength, a high degree of moisture resistance, and also the absence of fractures in or damages to the coating.

After the thermally treated electrodes 5 have left the heating chamber 1, they are supplied in a vertical position to unloading arrangement 10, namely, to the second orientating transporter 56. On the orientating transporter 56 the electrodes 5 are transferred from a vertical position to a horizontal one. The procedure of transferring the electrodes 5 is accomplished in much the same manner as the procedure of transferring them from a horizontal position to a vertical one which was described hereinabove while illustrating the operation of the loading arrangement 9. The only difference resides here in that on the orientating transporter 56 the coated portion of the electrode 5 is raised upward, while the electrodes 5 are conveyed on this transporter.

From the outlet of the orientating transporter 56 the electrodes 5 are supplied in a horizontal position to the belt transporter 66 of the removing mechanism 57, the electrodes 5 still being held by the magnetic holders 8. In the inlet area of the belt transporter 66 the electrodes 5 come in contact one by one with the depressed portion of the lower run of the endless pressing belt 80. Due to the aforesaid lower portion extending below the plane of the arrangement of the electrodes 5 on the transporter 66, it bears up against the electrode 5 contacting it, owing to the elasticity of the carrying member 7 the electrode 5 being lowered somewhat downward and disengaged from the serration 47 of the magnetic holder 8 holding it. It should be noted that the disengagement occurres smoothly and without any essential changes in the position of the electrodes 5 on the carrying member 71 of the belt transporter 66, which prevents the possibility of co-impact of the electrodes 5. Subsequent to the disengagement of the electrodes 5 from the magnetic holders 8, they are carried by the belt transporter 66 beyond the limits of the apparatus, for example, to the site of their packaging.

The proposed induction apparatus for drying and calcinating coated welding electrodes is an apparatus of continuous operation with fully automatized loading and unloading of the electrodes treated and may feature the following basic characteristics:
output-over 1000 electrodes per minute;
operating frequency of high-frequency converter-10 kilohertz;
maximum heating temperature of electrodes-450° C. and higher;
rod diameter of electrodes treated-from 3 to 6 millimeters;
length of electrodes treated-from 350 to 450 millimeters;
overall dimensions of apparatus-31×3.6×3.3 meter.

The apparatus for drying and calcinating coated welding electrodes according to the present invention, as compared to the known apparatus of the same designation, offers the following advantages.

First of all, it should be noted that the proposed apparatus enables to implement the thermal treatment of the coating of the electrodes in a fairly broad range of temperatures with a maximum temperature of about 500° C. and higher, which is ensured by the construction of the magnetic holders located outside the slot induction heater of the apparatus having a vertical arrangement of its slot. This in turn allows treatment on the apparatus of the electrodes both with an acid coating and with a basic coating, for example, with lime fluorspar, rutile or iron oxide coatings.

Secondly, the proposed apparatus ensures an excellent commercial aspect, as well as an improved quality of the thermal treatment of the electrodes due to minimizing the possibility of co-impacts of the electrodes and due to preventing the possibility of abrasion of the coating as a result of the absence of contacts of the electrodes with some elements of the apparatus over the entire path of conveying the electrodes through the apparatus.

Thirdly, the proposed apparatus features an increased degree of reliability due to the procedure of loading the electrodes into the apparatus as well as their subsequent unloading therefrom having a steady character, and, above all, due to the possibility of piling up of the electrodes in the slot induction heater being completely eliminated in the apparatus. The latter is achieved in that, on the one hand, the welding electrodes treated pass through the slot induction heater in a vertical position and are held only by the bare terminal end, while their coated end is arranged freely in the vertical slot of the induction heater. On the other hand, this is achieved in that the possibility of overheating and damaging of the magnetic holders is practically excluded in the zone of this induction heater, and, therefore, the possibility of spontaneous disengagement of the electrodes from the magnetic holders and short-circuiting of the bus-bars of the slot induction heater by the disengaged electrodes is also completely excluded.

Fourthly, the proposed apparatus features an increased output due to the arrangement for loading the electrodes into the apparatus operating without skipping of the electrodes ensures an absolute degree of filling of the chain conveyor of the apparatus, and due to the fact that the electrodes may be conveyed through the apparatus at a high speed. Furthermore, the construction of the apparatus allows adjustment of its constituent parts fairly easily and quickly and to re-adjustment of the apparatus for treating the electrodes of another size type.

Fifthly, since the welding electrodes are arranged always exactly vertically in the slot of the induction heater and the magnetic holders are located outside the slot of the induction heater, a minimum width of this slot may be pre-assigned in the proposed apparatus, reducing thereby the power consumed by it and improving its efficiency.

Finally, the construction of the proposed apparatus makes it possible to decrease the production area occupied by the apparatus, which is ensured by minimizing the spacings between the electrodes on all the elements intended for conveying the welding electrodes through the apparatus.

All this taken together makes the proposed apparatus rather convenient for service and failure-free in operation, and also allows increase of the profitableness of the apparatus and achievement of savings in material and personnel resources.

There have been described hereinabove some of the specific embodiments of the present invention. In view of the preceding description, various modifications and additions thereof, are perfectly evident to those skilled in the art to which the invention is related. Therefore, the present invention is not to be in the least limited by the foregoing description of the proposed apparatus for drying and calcinating coated welding electrodes with the use of induction heating, and any modifications and additions may be readily introduced into the construction of the apparatus without departing substantially from the spirit and scope of the invention defined by the appended claims.

What is claimed is:

1. An apparatus for drying and calcinating coated welding electrodes having a bare terminal end, using induction heating and comprising:
   a slot induction heater having a substantially vertical arrangement of a slot and subdivided into several sections along the length thereof,
   each of said sections of said slot induction heater incorporating top and bottom side electroconductive bus-bars and middle electroconductive bus-bars, all of said bus-bars being disposed along sides of said slot, for carrying an electric current of a substantially identical magnitude, and having different vertical widths,
   said middle electroconductive bus-bars having a vertical width exceeding a vertical width of said top and bottom side electroconductive bus-bars,
   said top side electroconductive bus-bars having a vertical width exceeding a vertical width of said bottom side electroconductive bus-bars,
   a chain conveyor provided with inlet and outlet areas and with carrying and return runs, and intended for conveying said coated welding electrodes inside said slot of said slot induction heater along the entire length thereof,
   a plurality of magnetic holders secured to said chain conveyer and intended for holding magnetically said coated welding electrodes,
   said magnetic holders being secured to said chain conveyer so that during the time of said conveying of said coated welding electrodes being held by said magnetic holders inside said slot of said slot induction heater, said magnetic holders are arranged over said slot,
   each of said magnetic holders representing a magnetic system incorporating a magnetic circuit and a permanent magnet having a pole piece and embraced by said magnetic circuit,
   an arrangement adapted for loading said coated welding electrodes into said chain conveyer and disposed adjacent to said inlet area of said chain conveyer,
   said arrangement for loading incorporating a receiving mechanism provided with inlet and outlet areas,
   said receiving mechanism providing means for arranging within said inlet area thereof, said coated welding electrodes substantially in parallel with a constant spacing exceeding an outer diameter of said coated welding electrodes and delivering within said outlet area thereof, said bare terminal ends of said coated welding electrodes to said magnetic holders,
   a first orientating transporter provided with carrying and return runs and disposed adjacent to said outlet area of said receiving mechanism,
   said carrying run of said first orientating transporter being arranged in a helical line and designed as a descending structure for transferring said coated welding electrodes being held by said bare terminal ends by said magnetic holders to a vertical position, providing freely suspended conveyance of said coated welding electrodes inside said vertically arranged slot of said induction heater, an arrangement for unloading said coated welding electrodes from said chain conveyer, disposed adjacent to said outlet area of said chain conveyer, said arrangement for unloading incorporating a second orientating transporter provided with carrying and return runs and with inlet and outlet areas, and disposed adjacent to said outlet area of said chain conveyer, said carrying run of said second orientating transporter being arranged in a helical line and designed as an ascending structure for withdrawing said coated welding electrodes being held by said bare terminal ends by said magnetic holders from a vertical position, and a mechanism for removing said coated welding electrodes from said magnetic holders disposed adjacent to said outlet area of said second orientating transporter.

2. An apparatus as recited in claim 1, wherein said magnetic circuit of each of said magnetic holders represents a hollow member and is provided with a slit made in the lower portion thereof along the entire length of said portion, said magnetic circuit accommodating thereinside said permanent magnet with said pole piece arranged with a clearance inside said slit and extending beyond the outer surface of said magnetic circuit, said pole piece being provided with a plurality of serrations each of which is intended for holding magnetically one of said coated welding electrodes and which are arranged along a line orientated in the direction of travelling of said chain conveyer, and with a constant pitch exceeding an outer diameter of said coated welding electrode, apexes of each of said serrations of said pole piece being chamfered with a chamfering radius at the point of contact of said serration with the surface of said bare terminal end of said coated welding electrode being smaller than a diameter of the rod of said coated welding electrode and providing substantially a mechanical point contact of the apex of said serration with said surface, neighbouring of said serrations of said pole pieces of any two adjacent of said magnetic holders mounted on said chain conveyer being spaced apart at a distance equal to said pitch of said serrations of said pole pitch of each of said magnetic holders.

3. An apparatus as recited in claim 2, wherein said receiving mechanism of said arrangement for loading represents a feeding transporter and is provided with a carrying run and a return run, said receiving mechanism incorporating a plurality of plates which are mounted on said runs and each of which is provided on the outer surface thereof with a plurality of transverse grooves, said transverse grooves being arranged with a constant spacing exceeding an outer diameter of said coated welding electrode and intended for receiving thermally untreated coated welding electrodes with said bare terminal ends facing one and the same side supplied externally into said arrangement for loading, said input area of said receiving mechanism located on said carrying run being inclined and having an adjustable angle of inclination, whereas said outlet area of said receiving mechanism being horizontal and arranged at such a level and so in relation to said carrying run of said chain conveyer that said bare terminal ends of said coated welding electrodes lying in said transverse grooves are capable of being arranged during the time of travelling of said receiving mechanism under said magnetic holders of said chain conveyer.

4. An apparatus as recited in claim 3, wherein each of said orientating transporters represents a belt transporter, each of said orientating transporters being provided with a guiding support for said carrying run thereof representing a portion of the cylindrical surface whose axis extends parallel to the direction of travelling of said carrying run of said chain conveyer in said inlet and outlet areas thereof, said guiding support being provided with a plurality of rollers which are mounted thereon in a helical line and which support said carrying run of said orientating transporter.

5. An apparatus as recited in claim 4, wherein said mechanism for removing thermally treated coated welding electrodes from said magnetic holders of said chain conveyer comprises:

a belt transporter provided with an inlet area and an outlet area and intended for arranging thereon said coated welding electrodes and for conveying them beyond the apparatus, said inlet area of said belt transporter being disposed adjacent to and in series with said outlet area of said second orientating transporter, a moving endless pressing belt provided with a lower run and an upper run and mounted above said inlet area of said belt transporter, said lower run of said pressing belt having the direction of travelling orientated at an angle to the plane of arranging said coated welding electrodes on said belt transporter so that said lower run of said pressing belt has a depressed portion and an elevated portion, said depressed portion of said lower run of said pressing belt being disposed below said plane of arranging said coated welding electrodes on said belt transporter for disengaging them from said magnetic holders of said chain conveyer.

6. An apparatus as recited in claim 5, wherein said top side electroconductive bus-bars of said slot induction heater have a vertical width one and a half times more than a vertical width of said bottom side electroconductive bus-bars.

7. An apparatus as recited in claim 1, wherein said receiving mechanism of said arrangement for loading represents a feeding transporter and is provided with a carrying run and a return run, said receiving mechanism incorporating a plurality of plates which are mounted on said runs and each of which is provided on the outer surface thereof with a plurality of transverse grooves, said tranverse grooves being arranged with a constant spacing exceeding an outer diameter of said coated welding electrode and intended for receiving thermally untreated coated welding electrodes with said bare terminal ends facing one and the same side, supplied externally into said arrangement for loading, said input area of said receiving mechanism located on said carrying run being inclined and having an adjustable angle of inclination, and said outlet area of said receiving mechanism being horizontal and arranged at such a level and so in relation to said carrying run of said chain conveyer that said bare terminal ends of said coated welding electrodes lying in said transverse grooves are capable of being arranged during the time of travelling of said receiving mechanism under said magnetic holders of said chain conveyer.

8. An apparatus as recited in claim 1, wherein
each of said orientating transporters represents a belt transporter,
each of said orientating transporters being provided with a guiding support for said carrying run thereof representing a portion of the cylindrical surface whose axis extends parallel to the direction of travelling of said carrying run of said chain conveyer in said inlet and outlet areas thereof,
said guiding support being provided with a plurality of rollers which are mounted thereon a helical line and which support said carrying run of said orientating transporter.

9. An apparatus as recited in claim 1, wherein said mechanism for removing thermally treated coated welding electrodes from said magnetic holders of said chain conveyer comprises;
a belt transporter provided with an inlet area and an outlet area and intended for arranging thereon said coated welding electrodes and for conveying them beyond the apparatus,
said inlet area of said belt transporter being disposed adjacent to and in series with said outlet area of said second orientating transporter,
a moving endless pressing belt provided with a lower run and an upper run and mounted above said inlet area of said belt transporter,
said lower run of said pressing belt having the direction of travelling orientated at an angle to the plane of arranging said coated welding electrodes on said belt transporter so that said lower run of said pressing belt has a depressed portion and an elevated portion,
said depressed portion of said lower run of said pressing belt being disposed below said plane of arranging said coated welding electrodes on said belt transporter for disengaging them from said magnetic holders of said chain conveyer.

10. An apparatus as recited in claim 1, wherein said top side electroconductive bus-bars of said slot induction heater have a vertical width one and a half times more than a vertical width of said bottom side electroconductive bus-bars.

11. An apparatus for drying and calcinating coated welding electrodes having a bare terminal end, using induction heating and comprising:
a slot induction heater having a substantially vertical arrangement of a slot and subdivided into several sections along the length thereof,
each of said sections of said slot induction heater incorporating top and bottom side electroconductive bus-bars and middle electroconductive bus-bars, all of said bus-bars being disposed along sides of said slot, for carrying an electric current of a substantially identical magnitude, and having different vertical widths,
said middle electroconductive bus-bars having a vertical width exceeding a vertical width of said top and bottom side electroconductive bus-bars,
said slot induction heater having the number of said bottom side electroconductive bus-bars exceeding the number of said top side electroconductive bus-bars,
a chain conveyer provided with inlet and outlet areas and with carrying and return runs, and intended for conveying said coated welding electrodes inside said slot of said slot induction heater along the entire length thereof,
a plurality of magnetic holders secured to said chain conveyer and intended for holding magnetically said coated welding electrodes,
said magnetic holders being secured to said chain conveyer so that during the time of said conveying of said coated welding electrodes being held by said magnetic holders inside said slot of said slot induction heater, said magnetic holders are arranged above said slot,
each of said magnetic holders representing a magnetic system incorporating a magnetic circuit and a permanent magnet having a pole piece and embraced by said magnetic circuit,
an arrangement for loading said coated welding electrodes into said chain conveyer disposed adjacent to said inlet area of said chain conveyer,
said arrangement for loading incorporating a receiving mechanism provided with inlet and outlet areas,
said receiving mechanism providing means for arranging within said inlet area thereof, said coated welding electrodes substantially in parallel with a constant spacing exceeding an outer diameter of said coated welding electrodes and delivering within said outlet area thereof, said bare terminal ends of said coated welding electrodes to said magnetic holders,
a first orientating transporter provided with carrying and return runs and disposed adjacent to said outlet area of said receiving mechanism,
said carrying run of said first orientating transporter being arranged in a helical line and designed as a descending structure for transferring said coated welding electrodes being held by said bare terminal ends by said magnetic holders to a vertical position, providing freely suspended conveyance of said coated welding electrodes inside said vertically arranged slot of said slot induction heater,
an arrangement for unloading said coated welding electrodes from said chain conveyer, disposed adjacent to said outlet area of said chain conveyer,
said arrangement for unloading incorporating a second orientating transporter provided with carrying and return runs and inlet and outlet areas, and disposed adjacent to said outlet area of said chain conveyer,
said carrying run of said second orientating transporter being arranged in a helical line and designed as an ascending structure for withdrawing said coated welding electrodes being held by said bare terminal ends by said magnetic holders from a vertical position, and
a mechanism for removing said coated welding electrodes from said magnetic holders, disposed adjacent to said outlet area of said second orientating transporter.

12. An apparatus as recited in claim 11, wherein
said magnetic circuit of each of said magnetic holders represents a hollow member and is provided with a slit made in the lower portion thereof along the entire length of said portion, said magnetic circuit accommodating there inside said permanent magnet with said pole piece arranged with a clearance inside said slit and extending beyond the outer surface of said magnetic circuit, said pole piece being provided with a plurality of serrations, each of which is intended for holding magnetically one of said coated welding electrodes and which are arranged along a line orientated in the direction of travelling of said chain conveyer and with a constant pitch exceeding an outer diameter of said coated welding electrode, apexes of each of said serrations of said pole piece being chamfered with a chamfering radius at the point of contact of said serration with the surface of said bare terminal end of said coated welding electrode smaller than a diameter of the rod of said coated welding electrode and providing substantially a mechanical point contact of the apex of said serration with said surface, neighbouring of said serrations of said pole pieces of any two adjacent of said magnetic holders mounted on said chain conveyer being spaced apart at a distance equal to said pitch of said serrations of said pole piece of each of said magnetic holders.

13. An apparatus as recited in claim 12, wherein
said receiving mechanism of said arrangement for loading represents a feeding transporter and is provided with a carrying run and a return run,
said receiving mechanism incorporating a plurality of plates which are mounted on said runs and each of which is provided on the outer surface thereof with a plurality of transverse grooves,
said transverse grooves being arranged with a constant spacing exceeding an outer diameter of said coated welding electrode and intended for receiving thermally untreated coated welding electrodes with said bare terminal ends facing one and the same side, supplied externally into said arrangement for loading,
said input area of said receiving mechanism located on said carrying run being inclined and having an adjustable angle of inclination, whereas said outlet area of said receiving mechanism being horizontal and arranged at such a level and so in relation to said carrying run of said chain conveyer that said bare terminal ends of said coated welding electrodes lying in said transverse grooves are capable of being arranged during the time of travelling of said receiving mechanism under said magnetic holders of said chain conveyer.

14. An apparatus as recited in claim 13, wherein
each of said orientating transporters represents a belt transporter,
each of said orientating transporters being provided with a guiding support for said carrying run thereof representing a portion of the cylindrical surface whose axis extends parallel to the direction of travelling of said carrying run of said chain conveyer in said inlet and outlet areas thereof,
said guiding support being provided with a plurality of rollers which are mounted thereon in a helical line and which support said carrying run of said orientating transporter.

15. An apparatus as recited in claim 14, wherein said mechanism for removing thermally treated coated welding electrodes from said magnetic holders of said chain conveyer comprises:

a belt transporter provided with an inlet area and an outlet area and intended for arranging thereon said coated welding electrodes and for conveying the same beyond the apparatus,
said inlet area of said belt transporter being disposed adjacent to and in series with said outlet area of said second orientating transporter,
a moving endless pressing belt provided with a lower run and an upper run and mounted above said inlet area of said belt transporter,
said lower run of said pressing belt having the direction of travelling orientated at an angle to the plane of arranging said coated welding electrodes on said belt transporter so that said lower run of said pressing belt has a depressed portion and an elevated portion,
said depressed portion of said lower run of said pressing belt being disposed below said plane of arranging said coated welding electrodes on said belt transporter for disengaging the same from said magnetic holders of said chain conveyer.

16. An apparatus as recited in claim 15, wherein said slot induction heater has twice the number of said bottom side electroconductive bus-bars as the nunmber of said top side electroconductive bus-bars, said middle electroconductive bus-bars having a vertical width twice a vertical width of said top or bottom side electroconductive bus-bars.

17. An apparatus as recited in claim 11, wherein
said receiving mechanism of said arrangement for loading represents a feeding transporter and is provided with a carrying run and a return run,
said receiving mechanism incorporating a plurality of plates which are mounted on said runs and each of which is provided on the outer surface thereof with a plurality of transverse grooves,
said transverse grooves being arranged with a constant spacing exceeding an outer diameter of said coated welding electrode and intended for receiving thermally untreated coated welding electrodes with said bare terminal ends facing one and the same side, supplied externally into said arrangement for loading,
said input area of said receiving mechanism located on said carrying run being inclined and having an adjustable angle of inclination, whereas said outlet area of said receiving mechanism being horizontal and arranged at such a level and so in relation to said carrying run of said chain conveyer that said bare terminal ends of said coated welding electrodes lying in said transverse grooves are capable of being arranged during the time of travelling of said receiving mechanism under said magnetic holders of said chain conveyer.

18. An apparatus as recited in claim 11, wherein
each of said orientating transporters represents a belt transporter,
each of said orientating transporters being provided with a guiding support for said carrying run thereof representing a portion of the cylindrical surface whose axis extends parallel to the direction of travelling of said carrying run of said chain conveyer in said inlet and outlet areas thereof,
said guiding support being provided with a plurality of rollers which are mounted thereon in a helical line and which support said carrying run of said orientating transporter.

19. An apparatus as recited in claim 11, wherein said mechanism for removing said thermally treated coated welding electrodes from said magnetic holders of said chain conveyer comprises:
- a belt transporter provided with an inlet area and an outlet area and intended for arranging thereon said coated welding electrodes and for conveying the same beyond the apparatus,
- said inlet area of said belt transporter being disposed adjacent to and in series with said outlet area of said second orientating transporter,
- a moving endless pressing belt provided with a lower run and an upper run and mounted above said inlet area of said belt transporter,
- said lower run of said pressing belt having the direction of travelling orientated at an angle to the plane of arranging said coated welding electrodes on said belt transporter so that said lower run of said pressing belt has a depressed portion and an elevated portion,
- said depressed portion of said lower run of said pressing belt being disposed below said plane of arranging said coated welding electrodes on said belt transporter for disengaging the same from said magnetic holders of said chain conveyer.

20. An apparatus as recited in claim 11, wherein said slot induction heater has twice the number of said bottom side electroconductive bus-bars as the number of said top side electroconductive bus-bars, said middle electroconductive bus-bars having a vertical width twice a vertical width of said top or bottom side electroconductive bus-bars.

* * * * *